(12) United States Patent
Briot et al.

(10) Patent No.: US 11,203,973 B2
(45) Date of Patent: Dec. 21, 2021

(54) METHOD FOR STORING AND PRODUCING ENERGY WITH OPTIMIZED WATER MANAGEMENT

(71) Applicant: IFP Energies nouvelles, Rueil-Malmaison (FR)

(72) Inventors: Patrick Briot, Pommier de Beaurepaire (FR); David Teixeira, Croissy-sur-Seine (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/771,579

(22) PCT Filed: Nov. 14, 2018

(86) PCT No.: PCT/EP2018/081169
§ 371 (c)(1),
(2) Date: Jun. 10, 2020

(87) PCT Pub. No.: WO2019/115121
PCT Pub. Date: Jun. 20, 2019

(65) Prior Publication Data
US 2020/0347783 A1 Nov. 5, 2020

(30) Foreign Application Priority Data
Dec. 11, 2017 (FR) ...................................... 1761915

(51) Int. Cl.
*F02C 6/16* (2006.01)
*F01D 25/32* (2006.01)
(Continued)

(52) U.S. Cl.
CPC ................ *F02C 6/16* (2013.01); *F01D 25/32* (2013.01); *F02C 1/04* (2013.01); *F02C 7/143* (2013.01)

(58) Field of Classification Search
CPC .... F02C 6/16; F02C 1/04; F02C 7/143; F01D 25/32; F05D 2260/211; Y02T 50/60
See application file for complete search history.

(56) References Cited

U.S. PATENT DOCUMENTS 5,537,822 A * 7/1996 Shnaid .................... F25B 9/004
60/659
9,404,512 B2 * 8/2016 Damgen ................... F02C 1/10
(Continued)

FOREIGN PATENT DOCUMENTS

EP 2494170 A2 9/2012
WO 2011/076926 A1 6/2011
(Continued)

OTHER PUBLICATIONS

International Search Report for PCT/EP2018/081169, dated Jan. 24, 2019; English translation submitted herewith (7 pgs.).

*Primary Examiner* — Shafiq Mian
(74) *Attorney, Agent, or Firm* — Fitch, Even, Tabin & Flannery, LLP

(57) ABSTRACT

The invention relates to a system and to a method for compressed-gas energy storage and recovery comprising at least a first and at least a second heat exchanger, a cold liquid storage means and a hot liquid storage means, as well as a separation means. The separation means is positioned after at least a first heat exchanger.
The system comprises at least one means for feeding the liquid leaving the separation means to the cold liquid storage means.

16 Claims, 5 Drawing Sheets

(51) Int. Cl.
*F02C 1/04* (2006.01)
*F02C 7/143* (2006.01)

(56) References Cited

U.S. PATENT DOCUMENTS

2011/0100213 A1* 5/2011 Finkenrath ................ F02C 1/02
                                                            95/92
2012/0216520 A1* 8/2012 Chen ....................... F25J 1/0045
                                                            60/412

FOREIGN PATENT DOCUMENTS

| WO | 2016012764 A1 | 1/2016 | |
|----|----|----|----|
| WO | 2016/079485 A1 | 5/2016 | |
| WO | WO-2016079485 A1 * | 5/2016 | ................ F02C 6/04 |

* cited by examiner

METHOD FOR STORING AND PRODUCING ENERGY WITH OPTIMIZED WATER MANAGEMENT

CROSS-REFERENCE TO RELATED APPLICATIONS

This application is a U.S. national phase application filed under 35 U.S.C. § 371 of International Application No. PCT/EP2018/081169, filed Nov. 14, 2018, designating the United States, which claims priority from French Patent Application No. 17/61.915, filed Dec. 11, 2017, which are hereby incorporated herein by reference in their entirety.

FIELD OF THE INVENTION

The present invention relates to the field of energy storage and production by air compression and expansion.

BACKGROUND OF THE INVENTION

Electricity production from renewable energies, for example by means of solar panels, or onshore or offshore wind turbines, is booming. The main drawbacks of these production means are intermittent production and the possible mismatch between the production period and the consumption period. It is therefore important to have a means of storing energy during production so as to release it during a consumption period.

There are many technologies allowing this balance to be achieved.

The best known of them is the Pumped Storage Plant (PSP) using two water reservoirs at different elevations. The water is pumped from the lower basin to the upper basin during the charging phase. The water is then sent to a turbine, towards the lower basin, during discharge.

Using batteries of different types (lithium, nickel, sodium-sulfur, lead-acid, etc.) can also meet this energy storage requirement.

Another technology, Flywheel Energy Storage (FES), consists in accelerating a rotor (flywheel) to a very high speed and in maintaining the energy in the system in form of kinetic energy. When energy is extracted from the FES system, the rotational speed of the flywheel is reduced as a consequence of the energy conservation principle. Adding energy to the FES system therefore causes an increase in the flywheel speed.

The energy storage technology using compressed gas (often compressed air) is promising. The produced energy that is not consumed is used for compressing air to pressures ranging between 40 bars and 200 bars using (possibly multi-stage) compressors. Upon compression, the air temperature increases. In order to limit the cost of the storage tanks and to minimize the electricity consumption of the compressor, the air can be cooled between each compression stage. The compressed air is then stored under pressure, either in natural cavities (caves) or in artificial reservoirs.

During the electricity production phase, the stored air is then sent to turbines so as to produce electricity. Upon expansion, the air cools down. In order to avoid too low temperatures (−50° C.) causing damage to the turbine, the air can be heated prior to expansion. Such plants have been operating for a number of years now, such as for example the Huntorf plant in Germany, since 1978, or the Macintosh plant in the USA (Alabama), since 1991. These two plants have the particular feature of using the stored compressed air for feeding gas turbines. These gas turbines burn natural gas in the presence of air under pressure in order to generate very hot combustion gases (550° C. and 825° C.) at high pressure (40 bars and 11 bars) prior to expanding them in turbines generating electricity. This type of process emits carbon dioxide. The Huntorf plant could emit approximately 830 kg $CO_2$ per megawatt of electricity produced.

There is a variant under development. It is an adiabatic process wherein the heat resulting from the compression of air is recovered, stored and released to the air prior to compression thereof. It is the technology known as AACAES (Advanced Adiabatic Compressed Air Energy Storage).

In this technology, the air is often air taken from the surrounding medium. It may therefore contain water in vapour form. This humidity varies depending on the geographic location and the temperature and/or the season. Upon cooling of the air after compression, the water contained in the air may condense totally or partly. This condensation can involve large amounts to be managed. For example, in Nice (France), in January, the air contains about 4 grams of water per kilogram of air. In august, this amount of water rises to 12 grams of water per kilogram of air. Few patents mention this water management problem. Some patents (WO-2016/012,764, WO-2011/076,926 and WO-2016/079,485) propose to recover the condensed water so as to store it in a simple storage tank. Besides, when it is not removed from the gas, the water contained in the gas can cause damage to the compressors and other equipments in which the compressed gas circulates.

Furthermore, when the air is cooled or heated, heat exchangers are used. These exchangers allow a hot gas to be cooled from a cold fluid (often a cold liquid) or a cold gas to be heated from a hot fluid (often a hot liquid).

Direct-contact heat exchangers are understood to be heat exchangers wherein direct contact occurs between a fluid (often liquid) and a gas. When direct-contact heat exchangers are used, matter exchanges may also take place between the fluid and the gas.

When direct-contact heat exchangers are used, the gas can become partly laden with fluid in form of gas or liquid droplets and/or part of the gas can condense or be absorbed by the fluid. This depends both on the fluid, the gas, the pressures and temperatures, as well as the exchange mode (gas heating or cooling). It may therefore be necessary to add fluid into the circuit or, on the contrary, to extract some, thus making management and regulation of these flows even more complex. Without management of these flows, the performances of the system are reduced and the risks of damage to the system elements are increased.

Heat exchangers without direct contact are understood to be heat exchangers wherein no direct contact occurs between the fluid and the gas. In this type of heat exchanger without direct contact, heat exchange occurs for example through a solid wall, but no matter transfer can take place between the fluid and the gas. Plate exchangers or shell and tube exchangers are examples of heat exchangers without direct contact.

In order to overcome the water management problems unaddressed so far, the present invention aims to improve the performance of the energy storage and recovery system by providing optimized management of the liquid contained in the system. The system therefore uses at least one liquid/gas separator positioned after at least one heat exchanger, in the air compression zone. The liquid recovered from the separators is collected and stored with the cold liquid so as to improve the flow of liquid in the system.

SUMMARY OF THE INVENTION

The invention relates to a compressed-gas energy storage and recovery system comprising:
- at least one gas compression means,
- at least one means of storing said compressed gas,
- at least one means of expanding said compressed gas,
- at least a first heat exchanger, said first heat exchanger being arranged downstream from said means of compressing said compressed gas,
- at least a second heat exchanger, said second heat exchanger being arranged upstream from said means of expanding said compressed gas,
- at least one cold liquid storage means and at least one hot liquid storage means,
- at least one means of separating said gas and said liquid.

Said first and second heat exchangers transfer heat between said gas and said liquid, said first and second heat exchangers being positioned between said cold liquid storage means and said hot liquid storage means, said separation means being positioned after at least a first heat exchanger. The system comprises at least one means of feeding said liquid leaving the separation means into at least one means of storing said cold liquid.

Preferably, said gas is air.

Advantageously, said liquid is water.

Advantageously, said first and second heat exchangers are merged.

According to an embodiment of the system according to the invention, several gas compression means and/or several means of expanding said gas are used, preferably at least three.

According to a variant of the invention, several first heat exchangers are used, preferably at least a first heat exchanger after each of said compression means.

Advantageously, several separation means are used, preferably at least one separation means after each of said first heat exchangers.

Preferably, several second heat exchangers are used, preferably at least a second heat exchanger upstream from each of said expansion means.

According to an implementation of the invention, at least one second heat exchanger is an exchanger with direct contact between said liquid and said gas.

According to an embodiment, said means for feeding the liquid leaving the separation means comprises an intermediate storage tank.

The invention also relates to an energy storage and recovery method wherein the following steps are carried out:
a) compressing a gas,
b) cooling a compressed gas by heat exchange with a cold liquid and storing the hot liquid at the heat exchanger outlet,
c) separating said cooled compressed gas and said condensed liquid, and storing said condensed liquid,
d) storing said cooled compressed gas,
e) heating said cooled compressed gas by means of a heat exchanger using the hot liquid stored in step c) and storing said cold liquid,
f) expanding said compressed gas,
g) injecting said condensed liquid stored in step c) into said stored cold liquid.

Advantageously, at least one of steps a) to c) is carried out several times prior to moving on to the next step.

Preferably, at least one of steps e) and f) is carried out several times prior to carrying out step g).

Preferably, said gas is air.

Advantageously, said liquid is water.

According to an implementation of the method according to the invention, in at least one step e), said gas is heated by direct-contact heat exchange with said hot liquid.

According to an embodiment of the method according to the invention, said condensed liquid and said liquid stored in step e) are stored separately.

BRIEF DESCRIPTION OF THE FIGURES

Other features and advantages of the system and of the method according to the invention will be clear from reading the description hereafter of embodiments given by way of non-limitative example, with reference to the accompanying figures wherein.

DETAILED DESCRIPTION OF THE INVENTION

Figure 1:
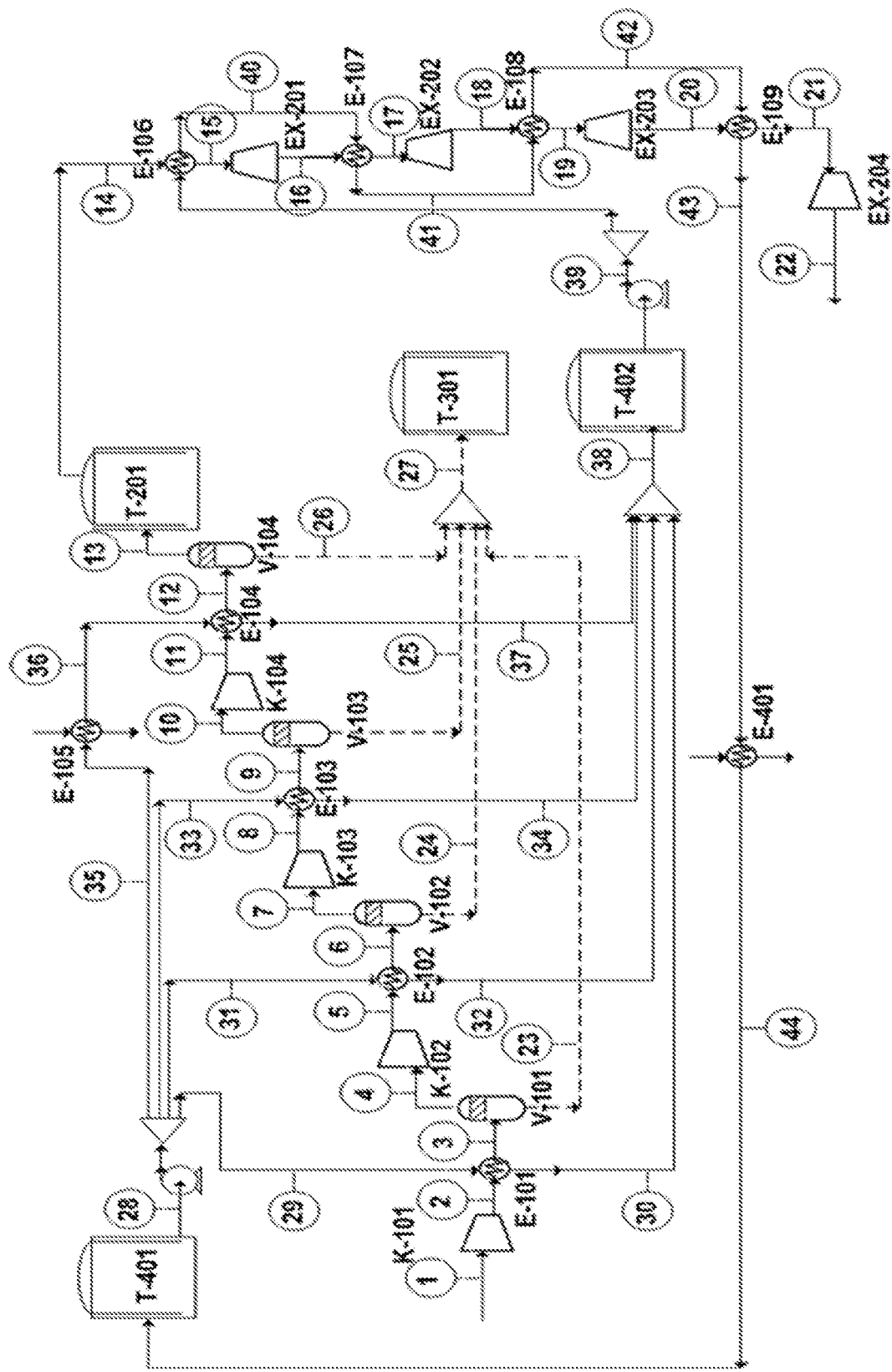
FIG. 1 illustrates an example of an energy storage and recovery system according to the prior art.

The present invention relates to a compressed-gas energy storage and recovery system. The system according to the invention comprises:
- at least one gas compression means allowing the pressure of the gas to be increased for storage purposes,
- at least one compressed gas storage means for storing the compressed gas to be used at a later time,
- at least one compressed gas expansion means for generating an energy,
- at least a first heat exchanger arranged downstream from the gas compression means. This first heat exchanger cools the compressed gas by circulating through the heat exchanger a liquid that flows in cold and leaves hot,
- at least a second heat exchanger positioned upstream from the compressed gas expansion means. This second heat exchanger heats the compressed gas prior to expansion, by circulating a liquid that flows in hot and leaves cold,
- at least one cold liquid storage means and at least one hot liquid storage means, these means enabling use of cold liquid for the first heat exchangers and use of hot liquid for the second heat exchangers,
- at least one separation means enabling separation of the gas and the liquid, and removal of the liquid traces that may be contained in the gas after cooling and might damage the system, notably the compression means. The separation means is positioned after at least a first heat exchanger,
- at least one means of feeding the liquid leaving the separation means into at least one cold liquid storage means, thus making it possible to use the recovered condensation liquid with the liquid used for the heat exchangers.

In this implementation, at least one compression means (a compressor for example) is used to compress the gas. The gas is subsequently cooled through at least one heat exchanger, referred to as "first heat exchanger".

Upon cooling, part of the gas (typically water vapour contained in air) may condense. In order to prevent this liquid from damaging the equipments of the system, a separation means (a gas/liquid separator for example) is positioned downstream from at least a first heat exchanger so as to recover the liquid formed upon cooling.

The cooled compressed gas separated from the condensation liquid is then stored in at least one compressed gas storage means.

What is referred to as "compression line" hereafter is the gas line connecting the gas inlet to the compressed gas storage means and passing through at least one compression means.

During energy recovery, the compressed gas contained in at least one compressed gas storage means is sent to at least one heat exchanger, referred to as "second heat exchanger", in order to be heated prior to being sent to at least one expansion means (a turbine for example) allowing the energy to be recovered.

What is referred to as "expansion line" hereafter is the gas line connecting the compressed gas storage means to the gas outlet and passing through at least one expansion means.

The liquid recovered in at least one separation means of the compression line and the cold liquid leaving at least a second heat exchanger used on the expansion line can be stored together in at least one cold liquid storage means.

The liquid contained in this cold liquid storage means is then used for cooling the gas, on the compression line, through the first heat exchangers positioned on this line.

Thus, the liquid flow is managed within the system, thereby limiting the addition or the removal of liquid inside the "liquid loop". What is referred to as "liquid loop" is the liquid circuit connecting the cold liquid storage means to the hot liquid storage means, and back to the cold liquid storage means.

The first and second heat exchangers are positioned on this liquid loop, between the cold liquid storage means and the hot liquid storage means.

Management of the liquid flow in the system allows to improve the system performances, to increase the lifetime of the equipments and to limit the consumption of energy and liquid. It can also avoid managing the liquid flow recovered from the separation means separately from the liquid used for the heat exchangers.

Preferably, the gas may be air. Advantageously, it may be taken from the ambient medium. This involves the advantage of avoiding costs related to gas production and storage, and to the logistics associated therewith.

Preferably, the liquid may be water. Indeed, the gas used, notably ambient air, may contain water. When choosing water as the liquid used in the exchangers, a single liquid is used in the system, thus simplifying the implementation of the system. Besides, using water as the heat-transfer liquid is inexpensive.

According to a variant of the invention, the first and second heat exchangers may be merged so as to limit the cost of these equipments.

According to an implementation of the invention, several gas compression and/or expansion means can be used, preferably at least 3 compression means and/or at least 3 expansion means. This feature allows the performances of the system to be improved. Indeed, when using several compression and/or expansion means, the final pressure of the compressed gas can be increased and the inlet/outlet operating pressure ranges of each compression and/or expansion means are reduced, which allows the performances of these means to be optimized.

Furthermore, several first heat exchangers for cooling the gas can be used, preferably a first heat exchanger after each compression means. This allows the performances of the system to be improved while enabling each compression means to operate at an optimum temperature.

According to another variant, several separation means can be used, preferably one after each first heat exchanger. Thus, the condensation liquid that may be generated in each first heat exchanger is eliminated before reaching the next compression means or the compressed gas storage means. Elimination of any traces of liquid as soon as it forms allows to avoid equipment damage risks and performance losses due to the presence of liquid in the system.

According to another variant, several second heat exchangers can be used, preferably one just upstream from each expansion means. It is thus possible to avoid temperatures that might be too cold at the expansion means outlet. Indeed, temperatures unsuited to the expansion means are responsible for expansion means performance losses.

According to an implementation of the invention, at least one second heat exchanger can be a heat exchanger with direct contact between the liquid and the gas. Part of the liquid is thus integrated into the compressed gas heated prior to expansion, thus improving the system performances and optimizing the liquid flow within the system. The object of the invention is particularly suited to this embodiment.

Alternatively, the first and second heat exchangers can be heat exchangers without direct contact between the liquid and the gas.

According to an implementation of the invention, the means of feeding the liquid leaving the separation means can comprise a tank for intermediate storage before this liquid leaving the separation means is stored in at least one cold liquid storage means, also comprising the liquid used in the heat exchangers. This intermediate storage tank can notably be used to assess the amount of condensed liquid, analyze the condensed fluid, homogenize the temperatures, etc.

The invention also relates to an energy storage and recovery method wherein the following steps are carried out:
 a) compressing a gas,
 b) cooling a compressed gas by heat exchange with a cold liquid and storing the hot liquid at the heat exchanger outlet,
 c) separating the cooled compressed gas and the condensed liquid, and storing the condensed liquid,
 d) storing the cooled compressed gas,
 e) heating the cooled compressed gas by means of a heat exchanger using the hot liquid stored in step c) and storing the cold liquid,
 f) expanding the compressed gas,
 g) injecting the condensed liquid stored in step c) into the stored cold liquid.

The method thus involves management of the liquid integrated in the system, allowing to limit the liquid consumption and the energy consumption, and to improve the system performances.

Preferably, at least one of steps a) to c) (for example a) or a) and b) or a) to c)) can be carried out several times before moving on to the next step. Thus, by carrying out several compression operations, the total pressure is increased, thus limiting the volume of the compressed gas storage means and therefore the cost thereof. Furthermore, the compression means can be optimized over more limited operating ranges. Using several first heat exchangers allows to operate each compression means at an optimum temperature, thus improving the operation thereof. Furthermore, using several separation means allows to best remove any traces of liquid, which improves the performances of the system on the one hand, and prevents damage to the equipments on the other hand, thereby increasing the lifetime thereof.

Preferably, at least one of steps e) and f) (for example step f) or steps e) and f)) can be carried out several times prior to carrying out step g). Using several expansion means allows each expansion means to have an optimum design over a reduced operating range. This enables the system performances to be improved. Similarly, using several second heat exchangers allows to operate each expansion means over an optimum temperature range, thus maximizing the efficiency of each expansion means.

Preferably, the gas may be air and, preferably, air taken from the ambient medium. Thus, the gas production and logistics costs are zero.

Preferably, the liquid may be water. Thus, the water contained in the gas, notably ambient air, is the same liquid as that used in the heat exchangers, thus facilitating implementation of the method according to the invention.

According to a variant of the method according to the invention, during at least one step e), the gas can be heated by direct-contact heat exchange with the hot liquid. Through this type of heat exchange, part of the liquid is integrated in the gas prior to expansion thereof, thus allowing optimized liquid flow management in the system and improving the system performances.

According to another variant of the method, the condensed liquid can be stored alone prior to being injected into the cold liquid leaving at least a second heat exchanger. This allows to carry out analyses, take samples or homogenize the temperatures prior to feeding this liquid with the cold liquid from at least a second heat exchanger.

Other features and advantages of the method according to the invention will be clear from reading the description hereafter of non-limitative example embodiments, with reference to the accompanying figures described hereafter.

Examples 1 to 3 are variants of the state of the art. Examples 4 and 5 are variant embodiments according to the invention.

The examples are carried out with 4 compression stages and 4 expansion stages, but this number of stages is not limitative.

In the description of these various examples, the same equipments (compressors for the compression means and turbines for the expansion means) are used for compression and expansion of the air. The characteristics of the compressors and turbines used are given in the table below.

|  | Pressure ratio | Efficiency (%) |
|---|---|---|
| Compressors | | |
| K-101 | 5.22 | 84.3 |
| K-102 | 4.435 | 83 |
| K-103 | 2.7974 | 81.4 |
| K-104 | 2.3422 | 71.8 |
| Turbines | | |
| EX-201 | 0.59 | 78 |
| EX-202 | 0.51 | 80.50 |
| EX-203 | 0.15 | 83 |
| EX-204 | 0.1861 | 85.50 |

Example 1: According to the Prior Art (FIG. 1)

This example can correspond to the system or to the method with water as the thermal fluid instead of a saline solution as described in patent DE-10-2010/055,750 A1.

51,350 kg/h outside air (flow 1), at a temperature of 20° C. and a pressure of 1,014 bar, containing 4.2 mol % water, is fed to a compression stage K-101 from where it flows at a higher pressure and at a higher temperature (flow 2).

This flow 2 is then cooled to 50° C. in an exchanger E-101 without direct contact by water at 40° C. (flow 29). The water leaves the exchanger at a higher temperature (flow 30) and it is sent to a hot liquid storage means T-402.

The cooled air is sent to a gas/liquid separator V-101 that separates the humidity of the condensed air (flow 23) from the air (flow 4). This condensed water is thereafter sent to a condensed liquid storage means T-301.

The air then flows into a second compression stage K-102 which it leaves at a higher pressure and temperature (flow 5). It is then cooled in an exchanger without direct contact E-102 with cold water (flow 31).

The hot water leaving the exchanger (flow 32) is sent to hot liquid storage means T-402.

The cooled air (flow 6) enters a gas/liquid separator V-102 separating the condensed humidity (flow 24) from the cold air (flow 7). The condensed humidity is sent to condensed liquid storage means T-301.

The cooled air (flow 7) enters a third compression stage K-103 which it leaves (flow 8) at a higher pressure and temperature. It is then cooled in an exchanger without direct contact E-103 with cold water (flow 33).

This hot water is then sent to hot liquid storage means T-402.

The cold air enters a gas/liquid separator V-103 where the condensed humidity (flow 25) is separated from the air (flow 10). This condensed humidity is then sent to condensed liquid storage means T-301.

The cold air (10) leaving separator V-103 then enters a last compression stage K-104 which it leaves (flow 11) at a higher pressure and temperature.

It is then cooled in an exchanger without direct contact E-104 with cold water (flow 36). This flow 36 can be cooled, by means of an exchanger E-105, to a lower temperature than that of the water used for cooling in heat exchangers E-101, E-102 and E-103. The hot water (flow 37) leaving exchanger E-104 is sent to hot liquid storage means T-402.

The cold air (flow 12) enters a gas/liquid separator V-104 where the condensed humidity (flow 26) is sent to condensed liquid storage means T-301.

The cold air (flow 13), 50,000 kg/h, leaving at a pressure of 136.15 bars and at a temperature of 30° C., is sent into compressed gas storage means T-201, which may be either natural or artificial. It now contains only 300 ppm water. The power consumption for the compression step is 10.9 MW. Cooling of the air during compression requires 54,689 kg/h coolant and condensation of the humidity of the air represents an amount of 1.35 t/h to be stored or eliminated.

The water stored in condensed liquid storage means T-301 is not managed: for example, condensed liquid storage means T-301 is regularly emptied.

During electricity production, the stored air (flow 14) is sent from compressed gas storage means T-201 to an exchanger without direct contact E-106 with the hot water (flow 39) from hot liquid storage means T-402. Exchanger E-106 can be identical to exchanger E-104 used for cooling. Alternatively, exchanger E-106 and exchanger E-104 can be merged to save on equipment costs. This is possible due to the cyclic operation: exchanger E-104/E-106 is used either during compression, or during expansion.

The hot air (flow 15) enters a turbine EX-201 where it undergoes expansion. The cooled water (flow 40) leaving exchanger E-106 is sent to exchanger without direct contact E-107 where it heats the cooled expanded air (flow 16). This heated air (flow 17) is sent to a second turbine EX-202 where it is expanded to a lower pressure (flow 18).

The cooled water (flow 41) leaving exchanger E-107 is sent to exchanger without direct contact E-108 where it heats the air leaving turbine EX-202, which is then heated (flow 19). This hot air is then sent to a third turbine EX-203 where it is expanded to a lower pressure (flow 20).

The less hot water (flow 42) leaving exchanger E-108 is sent to another exchanger without direct contact E-109. This exchanger is used for heating the air (flow 20) leaving turbine EX-203 prior to entering (flow 21) the last turbine EX-204.

After final expansion, the air is released to the atmosphere (flow 22) at a pressure of 1.02 bar and a temperature of 10° C. The water used for the various air heating cycles prior to expansion, which leaves exchanger E-109 (flow 43), is at a final temperature of 126° C.

Prior to being recycled, this water needs to be cooled, for example by a water exchanger or by an air cooler. The required cooling power is 5.5 MWth, i.e. a power consumption of 38.7 kWe.

The power produced by the successive expansions is 5.2 MWe.

Figure 2:
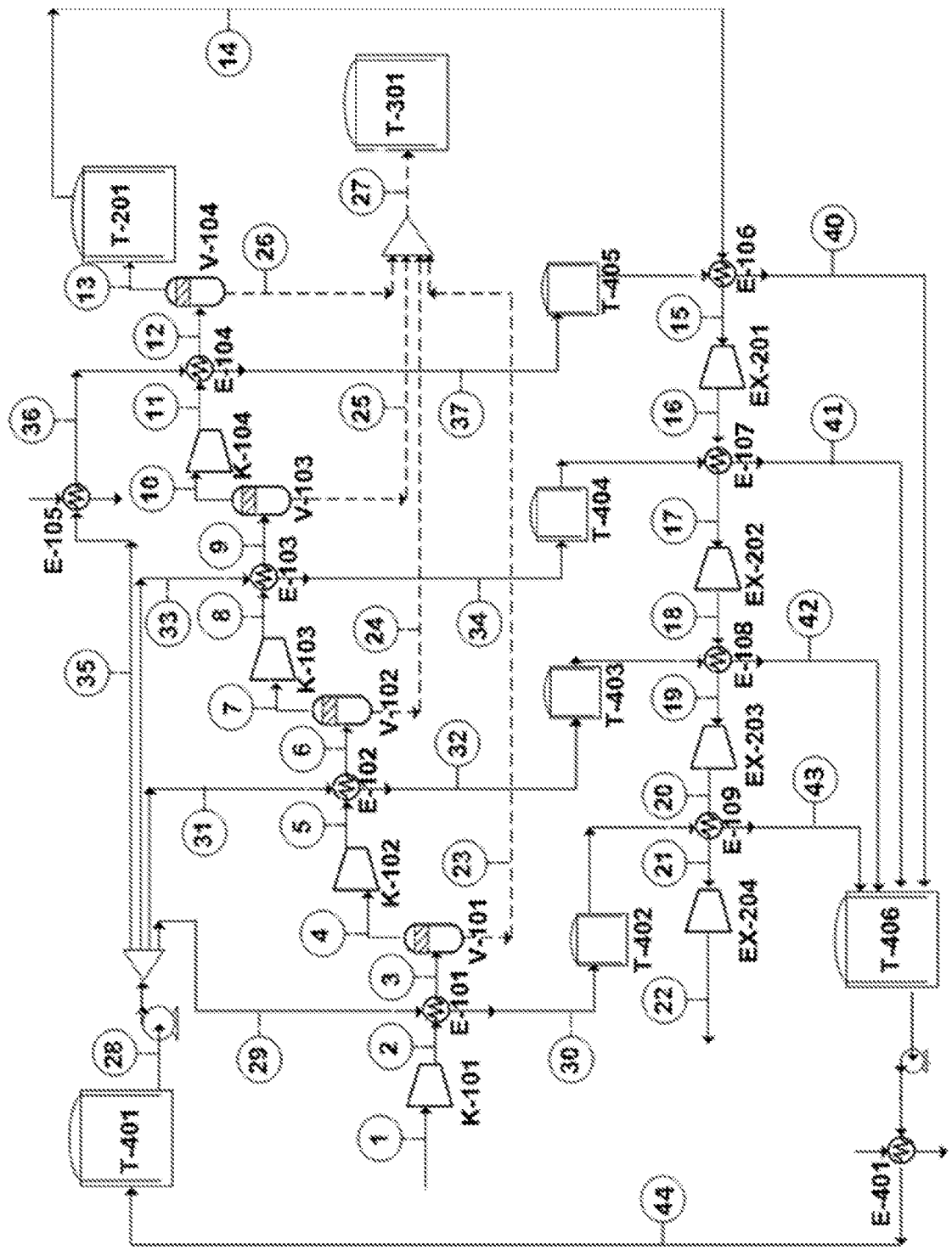
FIG. 2 illustrates a second example of an energy storage and recovery system according to the prior art.

Example 2: According to the Prior Art (FIG. 2)

This example describes a system or a method using water as the thermal fluid instead of molten salts as described in patent US-2011/0.016.864 A1.

51,350 kg/h outside air (flow 1), at a temperature of 20° C. and a pressure of 1,014 bar, containing 4.2 mol % water, is fed to a compression stage K-101 from where it flows at a higher pressure and at a higher temperature (flow 2).

This flow 2 is then cooled to 50° C. in a heat exchanger E-101 without direct contact (flow 3) by water at 40° C. (flow 29). The water leaves the exchanger at a higher temperature (flow 30) and it is sent to a hot liquid storage means T-402.

The humidity of the cooled air undergoes condensation (flow 23). A separator V-101 allows to separate the air (flow 4) from the condensed humidity (flow 23). This condensed water is thereafter sent to a condensed liquid storage means T-301.

The air then flows into a second compression stage K-102 which it leaves at a higher pressure and temperature (flow 5).

It is then cooled in an exchanger without direct contact E-102 with cold water (flow 31).

The hot water leaving the exchanger (flow 32) is sent to a hot liquid storage means T-403.

The cooled air (flow 6) enters a gas/liquid separator V-102 separating the condensed humidity (flow 24) from the cold air (flow 7).

The condensed humidity is sent to condensed liquid storage means T-301.

The cooled air (flow 7) enters a third compression stage K-103 which it leaves (flow 8) at a higher pressure and temperature.

It is then cooled in an exchanger without direct contact E-103 with cold water (flow 33).

The hot water (flow 34) at the outlet of exchanger E-103 is then sent to a hot liquid storage means T-404.

The cold air enters a gas/liquid separator V-103 where the condensed humidity (flow 25) is separated from the air (flow 10). This condensed humidity is then sent to condensed liquid storage means T-301.

The cold air (10) leaving separator V-103 then enters a last compression stage K-104 which it leaves (flow 11) at a higher pressure and temperature.

It is then cooled in an exchanger without direct contact E-104 with cold water (flow 36). This flow 36 can be cooled, by means of an exchanger E-105, to a lower temperature than that of the water used in exchangers E-101, E-102 and E-103. The hot water (flow 37) leaving exchanger E-104 is sent to a hot liquid storage means T-405.

The cold air (flow 12) enters a gas/liquid separator V-104 where the condensed humidity (flow 26) is sent to condensed liquid storage means T-301.

The cold air (flow 13), 50,000 kg/h, leaving at a pressure of 136.15 bars and at a temperature of 30° C., is sent into a compressed gas storage means T-201, which may be either natural or artificial. It now contains only 300 ppm water. The power consumption for the compression step is 10.9 MW.

As in the previous example, cooling of the air during compression requires 54,689 kg/h coolant and condensation of the humidity of the air represents an amount of 1.35 t/h to be stored or eliminated.

As in Example 1, the condensation water stored in condensed liquid storage means T-301 is not managed: for example, condensed liquid storage means T-301 is regularly emptied.

During electricity production, the stored air (flow 14) is sent from compressed gas storage means T-201 to an exchanger without direct contact E-106 with the hot water from hot liquid storage means T-405. Exchanger E-106 can be identical to exchanger E-104 used for cooling. Alternatively, exchanger E-106 and exchanger E-104 can be merged to save on equipment costs. This is possible due to the cyclic operation of the system: it is either used to compress the air, or to expand it.

The hot air (flow 15) enters a turbine EX-201 where it undergoes expansion. The cooled water (flow 40) leaving exchanger E-106 is sent to a cold liquid storage means T-406.

The air leaving turbine EX-201 is sent (flow 16) to exchanger without direct contact E-107 where it is heated (flow 17) by water from hot liquid storage means T-404.

The cooled water (flow 41) is sent to cold liquid storage means T-406.

This heated air (flow 17) is sent to a second turbine EX-202 where it is expanded to a lower temperature and pressure (flow 18).

It is then heated in heat exchanger without direct contact E-108 by water from hot liquid storage means T-403.

The cooled water (flow 42) leaving exchanger E-108 is sent to cold liquid storage means T-406. The heated air (flow 19) is sent to a turbine EX-203 where it is expanded to a lower pressure (flow 20).

This cold air is heated by hot water from hot liquid storage means T-402 in exchanger without direct contact E-109. This cooled water (flow 43) is sent to cold liquid storage means T-406.

The heated air (flow 21) is then sent to a last turbine EX-204 to be expanded to a lower pressure (flow 22).

After final expansion, the air, 50,000 kg/h, is released to the atmosphere (flow 22) at a pressure of 1.02 bar and a temperature of 17° C.

The water used for the various air heating cycles prior to expansion through exchangers E-106, E-107, E-108 and E-109 is at a final temperature of 129° C.

Prior to being recycled, this water needs to be cooled, for example by a water exchanger or by an air cooler. The required cooling power is 4.2 MWth, i.e. a power consumption of 31 kWe.

The power produced by the successive expansions is 5.4 MWe.

Figure 3:
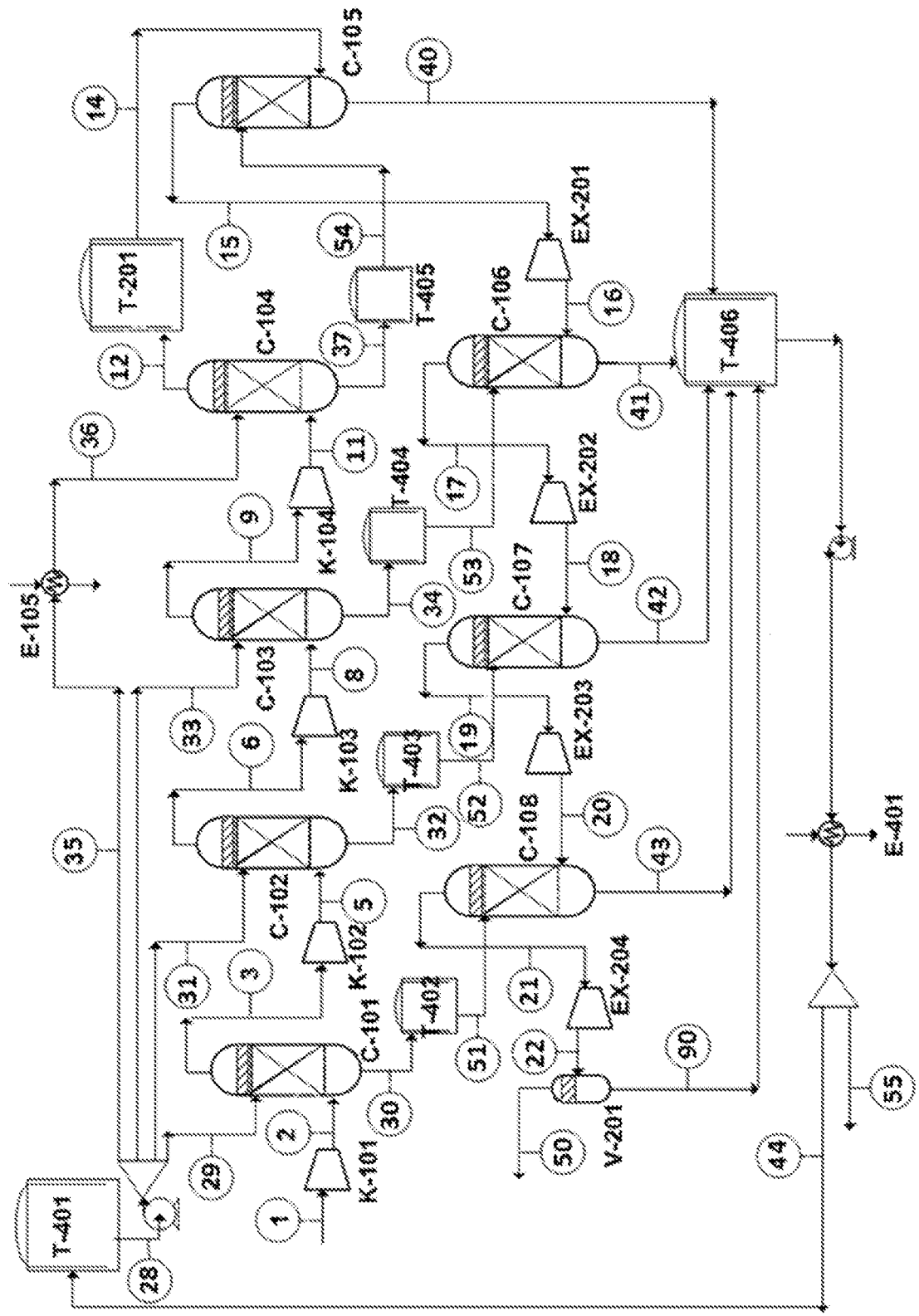
FIG. 3 illustrates a third example of an energy storage and recovery system according to the prior art.

Example 3: According to the Prior Art (FIG. 3)

51,350 kg/h outside air (flow 1), at a temperature of 20° C. and a pressure of 1,014 bar, containing 4.2 mol % water, is fed to a compression stage K-101 from where it flows at a higher pressure and at a higher temperature (flow 2).

This flow 2 is then cooled to 50° C. in a direct-contact heat exchanger C-101 by water at 40° C. (flow 21). This heat exchanger C-101 consists of a packed column into which the hot air (flow 2) flows through the bottom of the column. The cold water (flow 21) is injected at the top of the column, thus resulting in a cross-flow: one flow (air) moves upward while the other (water) moves downward. The hot water leaves the column at the bottom at a higher temperature (flow 22) and it is sent to a hot liquid storage means T-402.

The cooled air leaves heat exchanger C-101 at the top (flow 3) and it flows into a second compression stage K-102 which it leaves at a higher pressure and temperature (flow 4). It is then cooled in a direct-contact heat exchanger C-102 with cold water (flow 25).

The hot water leaving heat exchanger C-102 in the bottom (flow 26) is sent to a hot liquid storage means T-403.

The cooled air (flow 5) enters a third compression stage K-103 which it leaves (flow 6) at a higher pressure and temperature. It is then cooled in a direct-contact heat exchanger C-103 with cold water (flow 29). This hot water (flow 30) is then sent to a hot liquid storage means T-404.

The cold air (flow 7) leaves heat exchanger C-103 at the top and it flows into a last compression stage K-104 which it leaves (flow 8) at a higher pressure and temperature. It is then cooled in a direct-contact heat exchanger C-104 with cold water (flow 34). This flow 34 can be cooled, by means of a heat exchanger E-105, to a lower temperature than the water used in heat exchangers C-101, C-102 and C-103.

The hot water (flow 35) leaving the bottom of heat exchanger C-104 is then sent to a hot liquid storage means T-405.

The cold air (flow 9), 50,000 kg/h, leaving at a pressure of 134.34 bars and at a temperature of 30° C., is sent into a compressed gas storage means T-201, which may be either natural or artificial. It now contains only 320 ppm water. The power consumption for the compression step is 10.9 MW, identical to Examples 1 and 2.

In this example, there is no condensed water flow. On the other hand, the humidity of the air adds up to the water injected for cooling so that, after compression, more water is collected at the outlet than has been initially injected.

In Example 3, 178,338 kg/h water is injected for cooling and 179,715 kg/h leaves the process, i.e. 1,377 kg/h more than the initially injected amount. All the condensed humidity has been transferred to the coolant.

During electricity production, the stored air (flow 14) is sent from compressed gas storage means T-201 to a direct-contact heat exchanger C-105 with the hot water (flow 54) from hot liquid storage means T-405. Heat exchanger C-105 can be identical to exchanger C-104. Alternatively, heat exchangers C-104 and C-105 can be merged to save on equipment costs. This is possible due to the cyclic operation of the system: it is either used during compression, or during expansion.

The hot air (flow 15) leaves the column at the top and it enters a turbine EX-201 where it undergoes expansion.

The cooled water (flow 40) leaving the bottom of exchanger C-105 is sent to a cold liquid storage means T-406.

The air leaving turbine EX-201 is sent (flow 16) to direct-contact heat exchanger C-106 where it is heated by water circulating in a counter-current flow from hot liquid storage means T-404 (flow 53).

The cooled water (flow 41) leaving exchanger E-107 is sent to cold liquid storage means T-406.

The heated air (flow 17) is sent to a second turbine EX-202 where it is expanded to a lower pressure (flow 18).

It is then heated by direct-contact heat exchanger C-107 by water (flow 52) from hot liquid storage means T-403.

The cooled water (flow 42) leaving the bottom of heat exchanger C-107 is sent to cold liquid storage means T-406.

The heated air (flow 19) is sent to a turbine EX-203 where it is expanded to a lower pressure (flow 20).

This cold air is heated by hot water (flow 51) from hot liquid storage means T-402 in direct-contact heat exchanger C-108.

This cooled water (flow 43) is sent to cold liquid storage means T-406.

The heated air (flow 21) is then sent to a last turbine EX-204 to be expanded to a lower pressure (flow 22). This cold air is thereafter sent to a gas/liquid separator V-201 in order to separate the air (flow 50) from the liquid water that may be present (flow 90). This water is sent to cold liquid storage means T-406.

After final expansion, the air, 50,800 kg/h, is released to the atmosphere (flow 50) at a pressure of 1.02 bar and a temperature of 22° C.

The water used for the various air heating cycles prior to expansion through exchangers C-105, C-106, C-107 and C-108 is at a final temperature of 65.7° C.

Prior to being recycled, this water needs to be cooled, for example by a water exchanger or by an air cooler. The required cooling power is 5.3 MWth, i.e. a power consumption of 74.5 kWe.

The power produced by the successive expansions is 4.45 MWe.

The amount of water leaving after expansion of the air is 179,030 kg/h, i.e. 690 kg/h more than the amount required for cooling.

By increasing the outlet pressure of turbine EX4 to 2.48 bars instead of 1.02 bar, the amount of water collected at the outlet is equal to the amount of water required for cooling, but to the detriment of the generated power, which decreases to 3.6 MWe.

Figure 4:
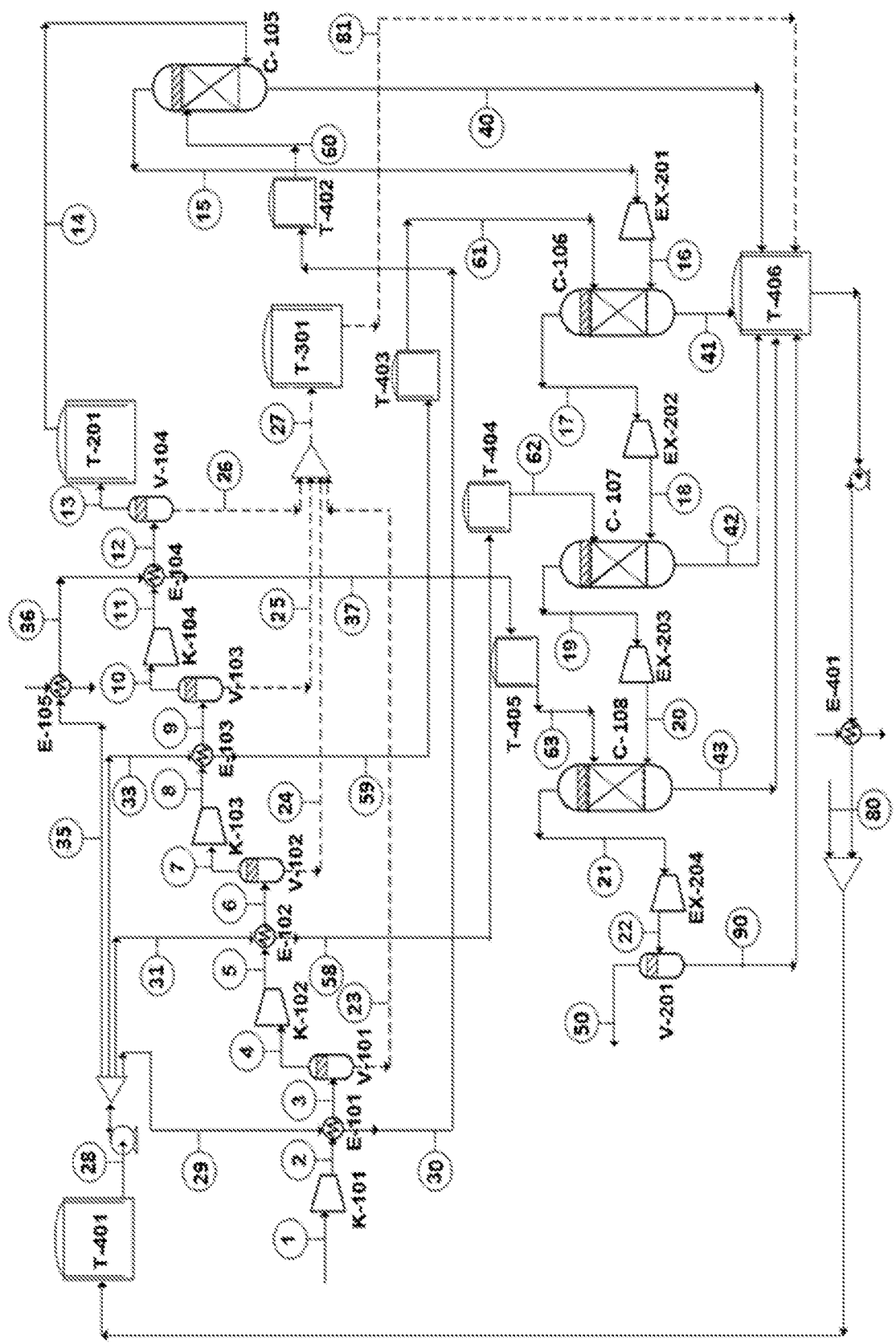
FIG. 4 illustrates a first embodiment of an energy storage and recovery system according to the invention.

Example 4: According to the Invention (FIG. 4)

51,350 kg/h outside air (flow 1), at a temperature of 20° C. and a pressure of 1,014 bar, containing 4.2 mol % water, is fed to a compression stage K-101 from where it flows at a higher pressure and at a higher temperature (flow 2).

This flow 2 is cooled to 50° C. in a heat exchanger E-101 without direct contact (flow 3) by water at 40° C. (flow 29). The water leaves the exchanger at a higher temperature (flow 30) and it is sent to a hot liquid storage means T-402.

The humidity of the cooled air undergoes condensation (flow 23). A separation means (for example a gas/liquid separator) V-101 allows to separate the air (flow 4) from the condensed liquid. This condensed water is thereafter sent to a condensed liquid intermediate storage means T-301.

The air flows into a second compression stage K-102 which it leaves at a higher pressure and temperature (flow 5). It is then cooled in a heat exchanger without direct contact E-102 with cold water (flow 31).

The hot water leaving exchanger E-102 (flow 58) is sent to a hot liquid storage means T-404.

The cooled air (flow 6) enters a gas/liquid separator V-102 separating the condensed humidity (flow 24) from the cold air (flow 7). The condensed humidity is sent to condensed liquid intermediate storage means T-301.

The cooled air (flow 7) enters a third compression stage K-103 which it leaves (flow 8) at a higher pressure and temperature. It is then cooled in a heat exchanger without direct contact E-103 with cold water (flow 33). The water leaving exchanger E-103 (flow 59) is then sent to a hot liquid storage means T-403.

The cold air enters a gas/liquid separator V-103 where the condensed humidity (flow 25) is separated from the air (flow 10). This condensed humidity is then sent to condensed liquid storage means T-301.

The cold air (flow 10) leaving separator V-103 then enters a last compression stage K-104 which it leaves (flow 11) at a higher pressure and temperature. It is then cooled in a heat exchanger without direct contact E-104 with cold water (flow 36). This flow 36 can be cooled, by means of a heat exchanger E-105, to a lower temperature than that of the water used in exchangers E-101, E-102 and E-103.

The hot water (flow 37) leaving heat exchanger E-104 is sent to a hot liquid storage means T-405.

The cold air (flow 12) enters a gas/liquid separator V-104 where the condensed humidity (flow 26) is sent to condensed liquid storage means T-301.

The cold air (flow 13), 50,000 kg/h, leaving at a pressure of 136.15 bars and at a temperature of 30° C., is sent into a compressed gas storage means T-201, which may be either natural or artificial. It now contains only 300 ppm water. The power consumption for the compression step is 10.9 MW.

As in Examples 1 and 2, cooling of the air during compression requires 54,689 kg/h coolant and condensation of the humidity of the air represents an amount of 1.35 t/h to be stored or eliminated.

The condensation water stored in condensed liquid intermediate storage means T-301 is sent via flow 81 to cold liquid storage means T-406. Thus, the condensation water is recovered and it can be used as heat-transfer fluid.

During electricity production, the stored air (flow 14) is sent from compressed gas storage means T-201 to a direct-contact heat exchanger C-205 with the hot water (flow 60) from hot liquid storage means T-402.

The hot air (flow 15) leaves heat exchanger C-205 at the top and it enters a turbine EX-201 where it undergoes expansion.

The cooled water (flow 40) leaving heat exchanger C-205 at the bottom is sent to a cold liquid storage means T-406.

The air leaving turbine EX-201 is sent (flow 16) to direct-contact heat exchanger C-206 where it is heated by water circulating in a counter-current flow from hot liquid storage means T-403 (flow 61). The cooled water (flow 41) is sent to cold liquid storage means T-406.

This heated air (flow 17) is sent to a second turbine EX-202 where it is expanded to a lower pressure (flow 18).

It is then heated in direct-contact heat exchanger C-206 by water (flow 62) from hot liquid storage means T-404.

The cooled water (flow 42) leaving heat exchanger C-206 at the bottom is sent to cold liquid storage means T-406.

The heated air (flow 19) is sent to a turbine EX-203 where it is expanded to a lower pressure (flow 20).

This cold air is heated by hot water (flow 63) from hot liquid storage means T-405 in direct-contact exchanger C-208.

This cooled water (flow 43) is sent to cold liquid storage means T-406.

The heated air (flow 21) is then sent to a last turbine EX-204 to be expanded to a lower pressure (flow 22).

This cold air is thereafter sent to a gas/liquid separator V-201 in order to separate the air (flow 50) from the liquid water that may be present (flow 90). This water is sent to cold liquid storage means T-406.

After final expansion, the air, 52,240 kg/h, is released to the atmosphere (flow 50) at a pressure of 1.02 bar and a temperature of 39° C.

The water used for the various air heating cycles through heat exchangers C-205, C-206, C-207 and C-208 and stored in cold liquid storage means T-406 is at a final temperature of 93.3° C.

Prior to being recycled, this water needs to be cooled, for example by a water exchanger or by an air cooler. The required cooling power is 3.3 MWth, i.e. a power consumption of 31.6 kWe.

The power produced by the successive expansions is 5.6 MWe.

The amount leaving the process after expansion of the air is 53,792 kg/h, i.e. less than the amount of water required for cooling. Despite the addition of condensation water to the water network, 900 kg/h water needs to be added to the network. The process consumes water.

Figure 5:
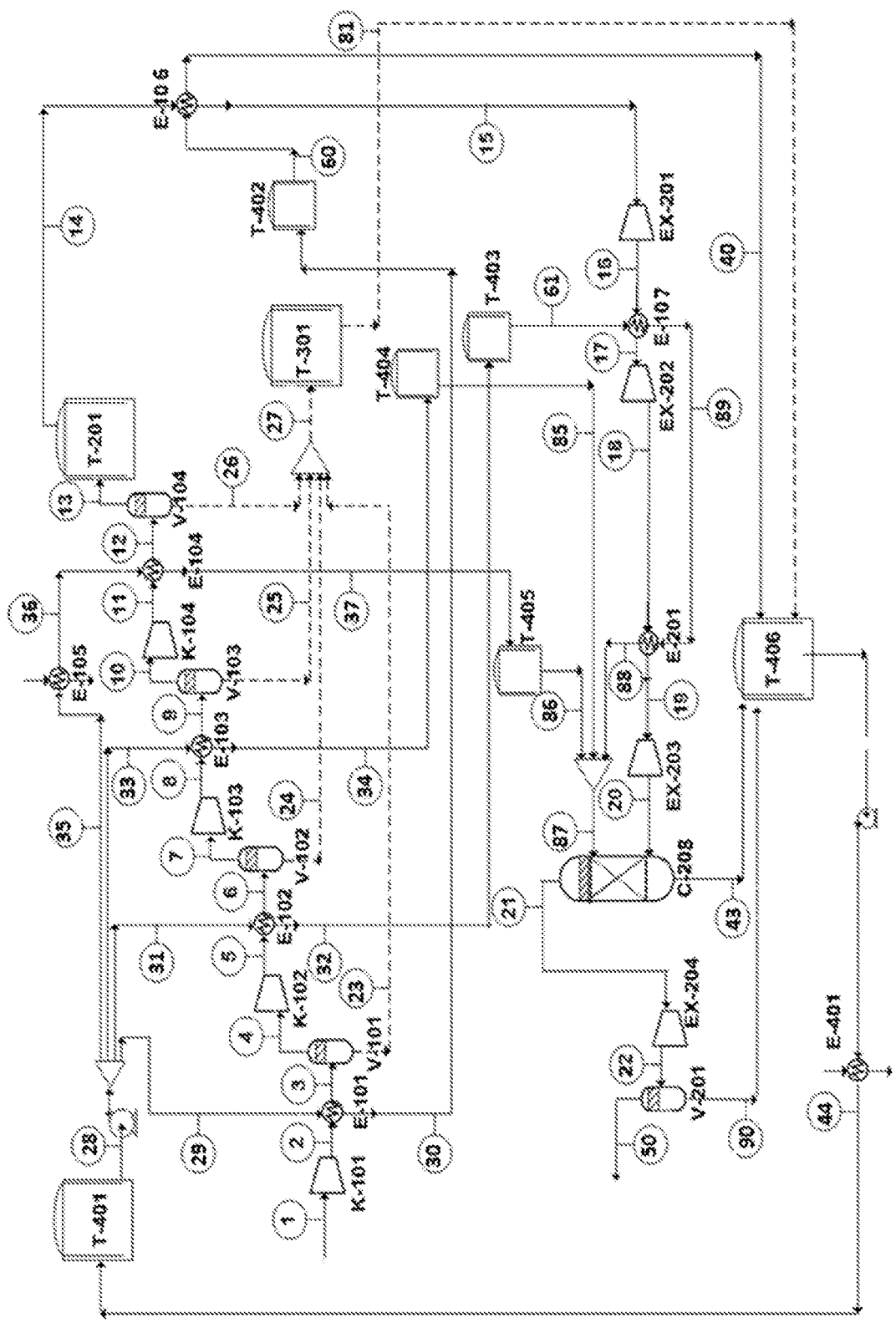
FIG. 5 illustrates a second embodiment of an energy storage and recovery system according to the invention.

Example 5: According to the Invention (FIG. 5)

51,350 kg/h outside air (flow 1), at a temperature of 20° C. and a pressure of 1,014 bar, containing 4.2 mol % water, is fed to a compression stage K-101 from where it flows at a higher pressure and at a higher temperature (flow 2).

This flow 2 is then cooled to 50° C. in a heat exchanger E-101 without direct contact (flow 3) by water at 40° C. (flow 29).

The water leaves the exchanger at a higher temperature (flow 30) and it is sent to a hot liquid storage means T-402.

The humidity of the cooled air undergoes condensation (flow 23). It is separated from the air (flow 4) in a gas/liquid separator V-101. This condensed water is thereafter sent to a condensed liquid intermediate storage means T-301.

The air flows into a second compression stage K-102 which it leaves at a higher pressure and temperature (flow 5). It is then cooled in a heat exchanger without direct contact E-102 with cold water (flow 31).

The hot water leaving exchanger E-102 (flow 32) is sent to a hot liquid storage means T-403.

The cooled air (flow 6) enters a gas/liquid separator V-102 separating the condensed humidity (flow 24) from the cold air (flow 7). The condensed humidity is sent to condensed liquid storage means T-301.

The cooled air (flow 7) enters a third compression stage K-103 which it leaves (flow 8) at a higher pressure and temperature.

It is then cooled in a heat exchanger without direct contact E-103 with cold water (flow 33). The water leaving heat exchanger E-103 (flow 34) is then sent to hot liquid storage means T-404.

The cold air enters a gas/liquid separator V-103 where the condensed humidity (flow 25) is separated from the air (flow 10). This condensed humidity is then sent to condensed liquid storage means T-301.

The cold air (flow 10) leaving separator V-103 then enters a last compression stage K-104 which it leaves (flow 11) at a higher pressure and temperature.

It is then cooled in a heat exchanger without direct contact E-104 with cold water (flow 36). This flow 36 can be cooled, by means of a heat exchanger E-105, to a lower temperature than that of the water used in heat exchangers E-101, E-102 and E-103.

The hot water (flow 37) leaving heat exchanger E-104 is sent to a hot liquid storage means T-405.

The cold air (flow 12) enters a gas/liquid separator V-104 where the condensed humidity (flow 26) is sent to condensed liquid storage means T-301.

The cold air (flow 13), 50,000 kg/h, leaving at a pressure of 136.15 bars and at a temperature of 30° C., is sent into a compressed gas storage means T-201, which may be either natural or artificial. It now contains only 300 ppm water. The power consumption for the compression step is 10.9 MW.

The condensation water stored in condensed liquid intermediate storage means T-301 is sent via flow 81 to cold liquid storage means T-406. Thus, the condensation water is recovered and it can be used as heat-transfer fluid.

During electricity production, the stored air (flow 14) is sent from compressed gas storage means T-201 to a heat exchanger without direct contact E-106 with the hot water (flow 60) from hot liquid storage means T-402. Heat exchanger E-106 can be identical to exchanger E-104. Alternatively, exchangers E-106 and E-104 can be merged to save on equipment costs. This is possible due to the cyclic operation of the process: it is used either during compression, or during expansion.

The hot air (flow 15) enters a turbine EX-201 where it undergoes expansion.

The cooled water (flow 40) leaving heat exchanger E-106 is sent to cold liquid storage means T-406.

The air leaving turbine EX-201 is sent (flow 16) to heat exchanger E-107 without direct contact where it is heated (flow 17) by water coming from hot liquid storage means T-403 (flow 61). The cooled water (flow 89) is sent to another heat exchanger without direct contact E-108.

This heated air (flow 17) is sent to a second turbine EX-202 where it is expanded to a lower pressure (flow 18).

It is then heated in a heat exchanger without direct contact E-208 by water (flow 89) from exchanger E-107.

The heated air (flow 19) is sent to a turbine EX-203 where it is expanded to a lower pressure (flow 20).

This cold air is heated in a direct-contact exchanger C-201 by hot water (flow 87) from an in-line mixer, mixing the hot waters from exchanger E-201 (flow 88), from hot liquid storage means T-404 (flow 85) and from hot liquid storage means T-405 (flow 86).

The cooled water (flow 43) leaving the bottom of heat exchanger C-208 is sent to cold liquid storage means T-406.

The heated air (flow 21) is then sent to a last turbine EX-204 to be expanded to a lower pressure (flow 22).

This expanded air is thereafter sent to a gas/liquid separator V-201 in order to separate the air (flow 50) from the liquid water that may be present (flow 90). This water is sent to cold liquid storage means T-406.

After final expansion, the air, 51,320 kg/h, is released to the atmosphere (flow 50).

The outlet pressure of last turbine EX-204 (2.50 bars) is selected in such a way that the final amount of water at the process outlet is equal to the amount of water initially used for cooling the air during compression, i.e. 54,688 kg/h. An amount of water equivalent to the amount of condensed water (humidity) is integrated in the air discharged to the atmosphere.

The judicious sequence of the thermal flows and the increase in the mass of material passing through last turbine EX-204 has allowed a gain in electricity production.

The power produced by the successive expansions is 6.4 MWe.

The hot water used for the various air heating cycles through heat exchangers E-106, E-107, E-201 and C-208 and stored in cold liquid storage means T-406 is at a final temperature of 85.4° C.

Prior to being recycled, this water needs to be cooled, for example by a water exchanger or by an air cooler. The required cooling power is 2.9 MWth, i.e. a power consumption of 30 kWe.

The summary table below gives the main results of the various examples.

| Embodiments | Electricity produced (MW) | Water addition/removal (kg/h) |
| --- | --- | --- |
| Example 1 (Prior art) | 5.4 | −1,349 |
| Example 2 (Prior art) | 5.2 | −1,349 |
| Example 3 (Prior art) | 4.5 | −690 |
| Example 4 (According to the invention) | 5.6 | +900 |
| Example 5 (According to the invention) | 6.4 | 0 |

Examples 4 and 5 where the condensation water is returned to the heat-transfer fluid circuit show an increase in the electrical power produced.

Furthermore, Examples 1 to 3 according to the prior art show that a significant amount of water is present and not used. It is therefore advantageous to manage the flow of condensation water so as to reuse the amount of water present.

Example 5 is particularly interesting because it shows a zero liquid flow, i.e. the flow of liquid is managed in an optimum manner in the system: no addition or removal of liquid is necessary. This example further shows a produced electricity gain far above the gain in the other examples.

The invention claimed is:

1. A compressed-gas energy storage and recovery system comprising:
   at least one gas compression means,
   at least one means of storing the compressed gas,
   at least one means of expanding the compressed gas,
   at least one first heat exchanger, the at least one first heat exchanger being arranged downstream from the at least one gas compression means,
   at least one second heat exchanger, the at least one second heat exchanger being arranged upstream from the at least one gas compression means,
   at least one cold liquid storage means and at least one hot liquid storage means,
   at least one separation means of separating the gas and the liquid, and
   at least one means of feeding the liquid leaving the at least one separation means into the at least one cold liquid storage means
   the at least one first heat exchanger and the at least one second heat exchanger transferring heat between the gas and the liquid, the at least one first heat exchanger and the at least one second heat exchanger being positioned between the at least one cold liquid storage means and the at least one hot liquid storage means, the at least one separation means being positioned after at least one first heat exchanger, and at least one of the at least one first heat exchanger and at least one of the at least one second heat exchanger being merged.

2. A system as claimed in claim 1, wherein the gas is air.

3. A system as claimed in claim 1, wherein the liquid is water.

4. A system as claimed in claim 1, wherein several gas compression means and/or several means of expanding the gas are used.

5. A system as claimed in claim 4, wherein several first heat exchangers are used, at least a first heat exchanger after each of the compression means.

6. A system as claimed in claim 5, wherein several separation means are used, at least one separation means after each of the first heat exchangers.

7. A system as claimed in claim 4, wherein several second heat exchangers are used, at least a second heat exchanger being provided upstream from each of the expansion means.

8. A system as claimed in claim 1, wherein at least one second heat exchanger is an exchanger with direct contact between the liquid and the gas.

9. A system as claimed in claim 1, wherein the means for feeding the liquid leaving separation means comprises an intermediate storage tank.

10. An energy storage and recovery method comprising steps of:
   a) compressing a gas to provide a compressed gas,
   b) cooling the compressed gas by heat exchange in at least one first heat exchanger with a cold liquid to form from the compressed gas a cooled compressed gas condensed liquid and to form a hot liquid from the cold liquid, and storing the hot liquid at the outlet of the heat exchanger,
   c) separating the cooled compressed gas and the condensed liquid, and storing the condensed liquid,
   d) storing the cooled compressed gas,
   e) heating the cooled compressed gas to form hot compressed gas by means of at least one second heat exchanger using the hot liquid stored in step b) whereby the hot liquid becomes cold liquid, and storing the cold liquid,
   f) expanding the compressed gas, and
   g) injecting the condensed liquid stored in step c) into the stored cold liquid,
       wherein at least one of the at least one first heat exchanger and at least one of the at least one second heat exchanger are merged.

11. A method as claimed in claim 10, wherein at least one of steps a) to c) is carried out several times prior to moving on to the next step d) of storing the cooled compressed gas.

12. A method as claimed in claim 10, wherein at least one of steps e) and f) is carried out several times prior to carrying out step g).

13. A method as claimed in claim 10, wherein the gas is air.

14. A method as claimed in claim 10, wherein the liquid is water.

15. A method as claimed in claim 10, wherein, in at least one step e), the gas is heated by direct-contact heat exchange with the hot liquid.

16. A method as claimed in claim 10, wherein the condensed liquid and the liquid stored in step e) are stored separately.

* * * * *